US008479090B2

(12) United States Patent (10) Patent No.: US 8,479,090 B2
Lemonik et al. (45) Date of Patent: Jul. 2, 2013

(54) RICH CONTENT IN A BROWSER-BASED WORK PROCESSOR

(75) Inventors: Micah Lemonik, New York, NY (US); Olga S. Belomestnykh, New York, NY (US); Janani R. Ravi, Jersey City, NJ (US); Luiz A. F. Pereira Filho, New York, NY (US); John M. Day-Richter, Denver, CO (US); Edgard Lindner, New York, NY (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/084,940

(22) Filed: Apr. 12, 2011

(65) Prior Publication Data

US 2011/0252303 A1    Oct. 13, 2011

Related U.S. Application Data

(60) Provisional application No. 61/323,231, filed on Apr. 12, 2010.

(51) Int. Cl.
*G06F 17/00* (2006.01)
(52) U.S. Cl.
USPC .......................................... 715/234; 715/255
(58) Field of Classification Search
USPC .......................................... 715/234, 200, 255
See application file for complete search history.

(56) References Cited

U.S. PATENT DOCUMENTS

| 6,745,208 B2 * | 6/2004 | Berg et al. ............................. 1/1 |
| 7,340,673 B2 * | 3/2008 | Malone ........................ 715/255 |
| 2004/0044966 A1 * | 3/2004 | Malone ........................ 715/530 |
| 2005/0076330 A1 * | 4/2005 | Almgren et al. ............... 717/113 |
| 2006/0161841 A1 * | 7/2006 | Horiuchi et al. ............... 715/513 |
| 2009/0006454 A1 * | 1/2009 | Zarzar et al. .................. 707/102 |
| 2011/0252312 A1 * | 10/2011 | Lemonik et al. ............... 715/255 |
| 2011/0258538 A1 * | 10/2011 | Liu et al. ....................... 715/256 |

FOREIGN PATENT DOCUMENTS

WO    2005/114467    12/2005

OTHER PUBLICATIONS

Cayenne-McCall, Lawrence. "Synchronous 3D Document Collaboration." Pace University, Department of Computer Science; Nov. 2008. (42 pages).
International Search Report & Written Opinion for Application No. PCT/US2011/032075, dated Jul. 6, 2011, 14 pages.
Hodel, Thomas B., Dominik Businger, and Klaus R. Dittrich. "Supporting Collaborative Layouting in Word Processing." University of Zurich, Department of Informatics; Zurich, Switzerland, 2004. (18 pages).

(Continued)

*Primary Examiner* — Manglesh M Patel
(74) *Attorney, Agent, or Firm* — Ropes & Gray LLP

(57) ABSTRACT

A tangible computer-readable storage medium having encoded on it data that represents a model of a document, the document model including a one-dimensional character string that includes characters of the document in an order in which they appear in the document; a map of styles that includes markers that correspond to changes in styles in the document, and pointers to the character string, wherein the pointers define locations along the character string at which the changes in styles are to occur and define style runs between matched markers; and one or more external references to objects outside the document model, the external references including identifiers for the objects and pointers to the character string indicating where in the character string the object will appear.

14 Claims, 9 Drawing Sheets

OTHER PUBLICATIONS

Microsoft. "Microsoft Office: Microsoft Office Word 97-2007 Binary File Format (.doc) Specification." Microsoft Corporation, 2007. (210 pages).

Raman, T.V. "Cloud Computing and Equal Access for All." Google, Inc., 2008. (4 pages).

Shen, Haifeng and Chengzheng Sun. "Flexible Merging for Asynchronous Collaborative Systems." Griffith University, School of Computing and Information Technology; Brisbane, Australia, 2002. (27 pages).

Shen, Haifeng, Steven Xia, and Chengzheng Sun. "Integrating Advanced Collaborative Capabilities into Web-Based Word Processors." Nanyang Technological University, School of computer Engineering; Singapore, 2007. (8 pages).

* cited by examiner

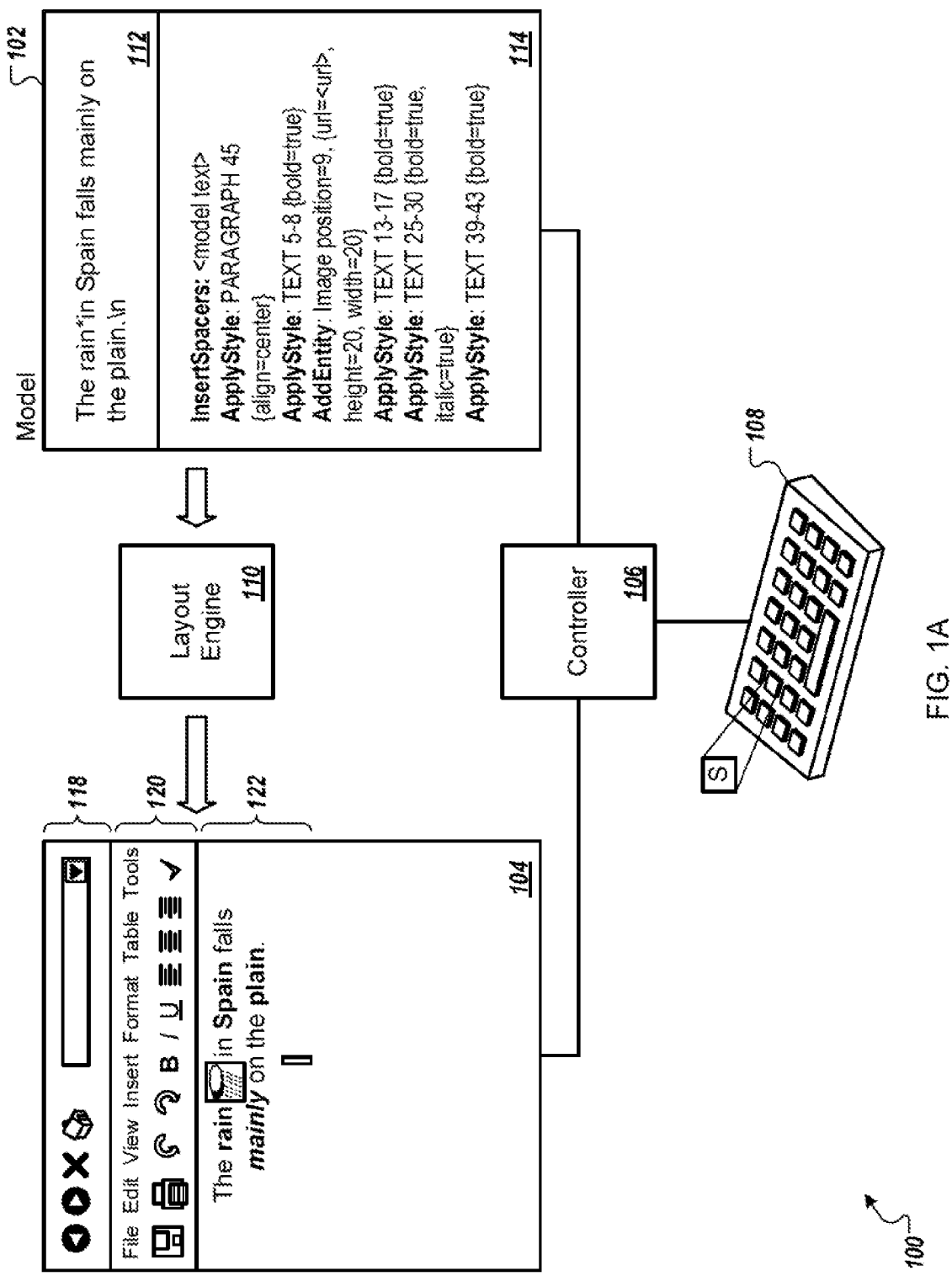

RICH CONTENT IN A BROWSER-BASED WORD PROCESSOR

CROSS-REFERENCE TO RELATED APPLICATIONS

This application claims priority to U.S. Provisional Application Ser. No. 61/323,231, filed on Apr. 12, 2010, entitled "Rich Content in a Browser-Based Word Processor," the entire contents of which are hereby incorporated by reference.

TECHNICAL FIELD

This document relates to systems and techniques for storing and manipulating data that represents an electronic document such as a word processing document.

BACKGROUND

Electronic word processing systems permit users to create complex documents that can be reviewed, edited, and shared by others. Similarly, other productivity applications permit the creation of electronic documents such as spreadsheets and slide-based presentations.

Cloud-based, or hosted, word processing applications that execute from within client-based web browsers to access server-based documents, have become very popular recently. A cloud-based application can be beneficial in that it is presented in a browser, which almost all computer users fully understand, it can be accessed from a variety of far flung computers, and from a variety of users, including by multiple users collaborating at the same time on the editing of a document. However, browser-based applications may also include a number of limits because browsers may seek to cabin the accessibility that applications have to an underlying computer system, and rendering is limited to whatever the browser is capable of doing.

SUMMARY

This document describes systems and techniques that may be used to provide a graphical user interface for a word processing application that executes in a web browser. As discussed here, a document model for storing data regarding a document may include a one-dimensional textual string that has all the raw text of the document, and may also have certain limited layout characters such as characters that indicate the occurrence of a paragraph break. In parallel with this string of text, but separate from it, the model may include a sparse map of styles that denote when properties of the text in the document is to change. The space between matched changes may be referred to as a run of characters, and the endpoint character positions of the run may be specified in the style map (e.g., either directly or by defining the position of one end, along with the length of the run).

The document may be displayed by a web browser by rendering the document model into a document object model (DOM) of the browser. Such rendering may involve traversing the character string and applying the map of styles to the characters in the string so as to format those characters. Certain reserved control characters may also be included in the character string. Those control characters are not rendered literally, but are instead replaced by a defined operation. For example, the control characters "\n" may represent a paragraph break, and may be rendered as such (and removed from the characters that are rendered literally) in the DOM.

Such features may, in certain implementations, provide one or more advantages. The document model and techniques described here can, for example, provide for a compact yet flexible model for storing, transmitting, editing, and rendering information for a document. The model can also be coordinated conveniently between a client and a server system that stores a master copy of the model, and further to other clients that may be concurrently editing the document through the server system. Coordination can be improved where changes, or mutations, to the model have a deterministic way of being transformed against any other mutation without having to know the true state of the document. As such, separate clients can apply, independently of each other, rules for resolving overlapping or conflicting changes and the document models at each such client can remain coordinated with each other.

In one implementation, a tangible computer-readable storage medium is disclosed, and the medium has encoded thereon data representing a model of a document. The document comprises a one-dimensional character string that includes characters of the document in an order in which they appear in the document; a map of styles that includes markers that correspond to changes in styles in the document, and pointers to the character string, wherein the pointers define locations along the character string at which the changes in styles are to occur and define style runs between matched markers; and one or more external references to objects outside the document model, the external references including identifiers for the objects and pointers to the character string indicating where in the character string the object will appear. The one-dimensional character string can further include reserved control characters that identify breaks in the document to be visible when the document is rendered on a computing device. The string can also define indexed positions along the string that are referenced by markers in the map of styles. In addition, reversing style changes can be represented in the sparse map of styles by a paired set of markers that are correlated with each other in the sparse map of styles.

In some aspects, the markers in the paired set are arranged so that, if text is added in the document between the markers, the pointer for one of the markers shifts by an integer equal to a number of characters in the added text. Also, the sparse map of styles can define one or more tethered styles that are correlated to a particular character in the one-dimensional character string rather than to a position in the string. Moreover, the tethered styles can be implemented by markers in the one-dimensional character string. In addition, the model can further comprise one or more entity identifiers in the one-dimensional character string, the entity identifiers pointing to objects external to the document model whose content is integrated into the document when the document is rendered from the model. Moreover, the one-dimensional character string can include multiple instances of an identifier for a single entity.

In another implementation, a computer-implemented method of generating a document from a document model is disclosed. The method comprises identifying, with a computing device, one or more characters in a one-dimensional character string that includes the characters of the document, and searching an electronic sparse map of styles that is separate from, but correlates to, the one-dimensional character string, for style markers that apply to a span of characters that covers the identified one or more characters. The method also comprises generating the document using the computing device by applying, to the one or more characters, formatting that corresponds to style markers found to apply to the span of characters. Generating the document can comprise rendering the document model into a document object model (DOM) of a web browser on the computing device. The method can also include locating in the one-dimensional character string one or more identifiers for objects outside the document model, accessing the objects, and rendering the objects into the document. The one or more objects can also comprise digital images, and rendering the objects into the document can comprise placing an anchor point for each digital image between characters in the document where a corresponding identifier for the image is located in the one-dimensional character string. Moreover, the method can further comprise receiving a user input in the document, correlating a location of the user input in a displayed view of the document to a position in the one-dimensional character string, and copying the user input to the one-dimensional character string.

In some aspects, the user input comprises a paragraph break, and wherein copying the user input to the one-dimensional character string comprises inserting into the character string a reserved character combination that triggers the creation of a paragraph break when the document is generated. Generating the document can comprise traversing the one-dimensional character string using pointers in the sparse character map that are mapped to the character string, and applying a particular formatting between a first pointer that activates the formatting, and a second pointer that deactivates the formatting. Moreover, the method can further comprise receiving user input in the document at a location between the first pointer and the second pointer, and adjusting a location in the character string to which the second pointer points by an integer number that is equal to a number of characters in the user input. The map of styles can define one or more tethered styles that are correlated to a particular character in the one-dimensional character string rather than to a position in the string. The styles can be implemented by markers in the one-dimensional character string.

In yet another implementation, a model for an electronic document stored on a tangible computer-readable storage medium is disclosed. The model comprises a one-dimensional character string that includes a plurality of plaintext characters to be represented literally in the electronic document and one or more control codes for defining paragraph breaks in the electronic document; a map of styles that is separate from, but correlated to, the one-dimensional character string, and that defines style markers that apply to a span of characters that covers the identified one or more characters; and one or more pointers in the model directed toward items external of the model to cause the external items to be incorporated into the electronic document.

The details of one or more embodiments are set forth in the accompanying drawings and the description below. Other features and advantages will be apparent from the description and drawings, and from the claims.

DESCRIPTION OF DRAWINGS

FIG. 1A is a conceptual diagram of a system for managing display and interaction with a browser-based word processing application.

Like reference symbols in the various drawings indicate like elements.

DETAILED DESCRIPTION

Figure 1B:
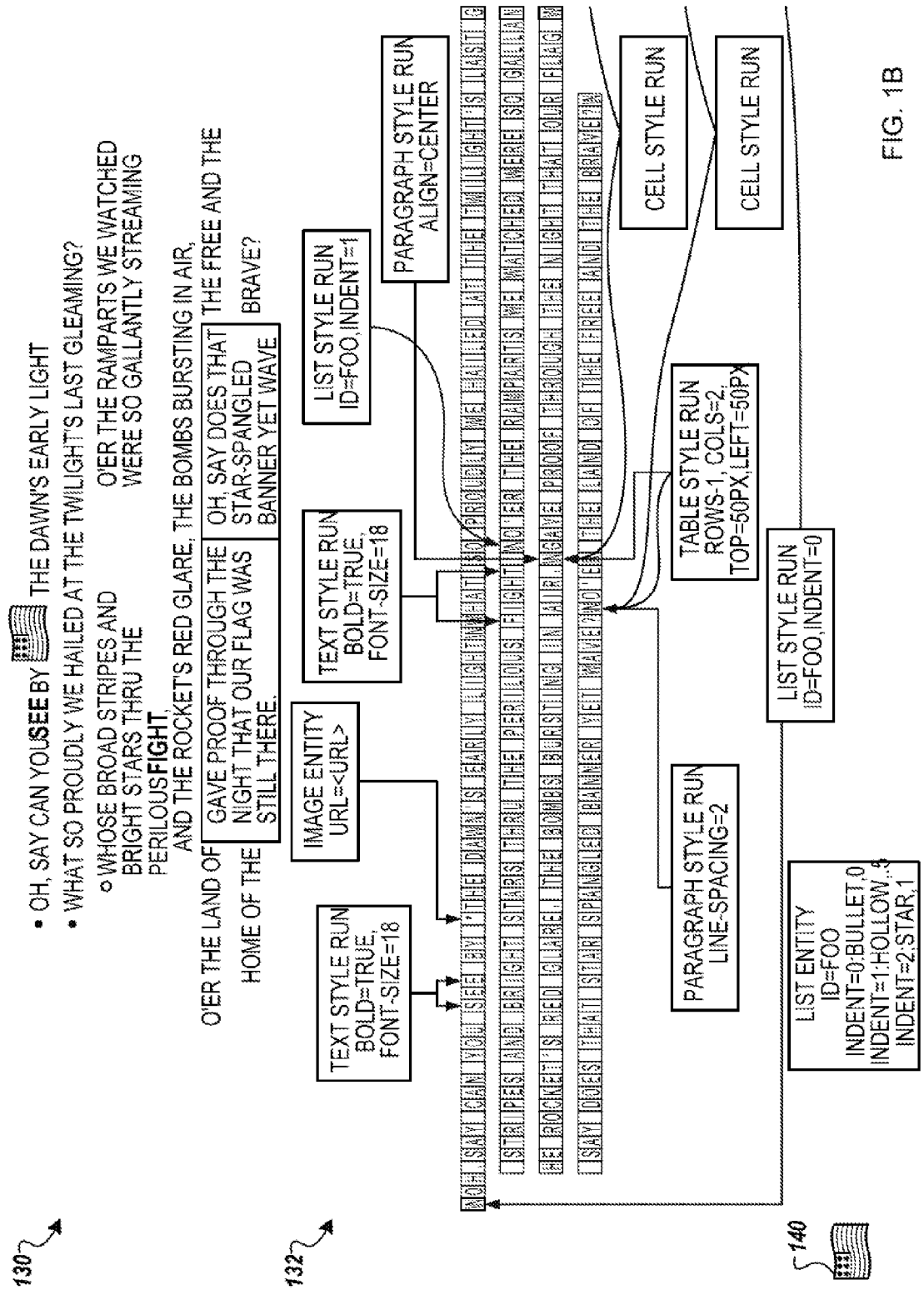
FIG. 1B shows a schematic view of a document and a data model for representing the document.

This document describes systems and techniques for providing a graphical user interface for a word processing application (or other similar applications, such as slide presentation applications, spreadsheets, desktop publishing applications, and the like) that executes in a web browser. Such systems and techniques may include a document model for storing data about a document. The document model may include raw document text, special layout characters such as paragraph breaks, style and formatting information, and information about embedded objects such as tables and images.

The document may be displayed by a web browser by rendering the document model into a document object model (DOM) of the browser. For example, a character string associated with the raw document text may be traversed, and style and formatting may be applied to the text, and embedded objects may be inserted. The document model and techniques associated with the model may provide for a compact yet flexible model for storing, transmitting, editing, and rendering document information. The model may be coordinated between a client and server system that stores a master copy of the model. In addition, multiple clients may simultaneously access the model, and changes to the model may be coordinated between the multiple clients.

FIG. 1A is a conceptual diagram of a system 100 for managing display and interaction with a browser-based word processing application. In general, in this example a document model 102 is provided to a web browser 102. For example, the model 102 can include document text, formatting and style information, and information related to embedded entities, such tables, images, and other such objects. The model 102 may be rendered into a format such as a Document Object Model (DOM) that can be displayed by the browser 102. Upon rendering the model 102, for example, the document may be displayed within the browser 104. For example, a web page displayed by the browser 104 can include one or more embedded applications, such as applications implemented using JavaScript, and Asynchronous JavaScript and XML (AJAX), for presenting the word processing document, as well as user interface controls that enable user interactions with the document. In some implementations, a controller 106 can handle the user interactions. For example, by intercepting one or more events associated with user input (e.g., the user typing the letter "s" included on a keyboard 108), the controller can apply corresponding changes to the model 102 and to the view of the word processing document displayed by the web browser 104.

In some implementations, the changes may be applied by a layout engine 110. For example, the layout engine 110 may include computer code for creating a visual representation of the model 102 within a view of a browser application for working with and presenting the word processing document. The changes, for example, may be initially applied to the model 102, and the layout engine 110 may render a view of the resulting model 102. As one example, the layout engine may be programmed to render portions of the model (e.g., each character) in an off screen display element (e.g., implementing a div element) and may measure the size of such an element to determine how much space on an editing surface the portion of the model should be allotted. Other portions may then be computed to be displayed at positions relative to the portions before them (e.g., character n+1 may have its left edge computed to be at a horizontal position that corresponds to the right edge of character n).

In some implementations, the model 102 can include various portions or structures for storing data associated with the word processing document, such as a text portion 112 and a style and entity portion 114. In some implementations, the model 102 may include additional portions or structures for storing data.

The text portion 112 can include a series of characters that represent content for the word processing document. In some implementations, the text portion 112 may be represented by a one-dimensional string that includes characters of the document in an order in which they appear in the document. The one-dimensional string may also include reserved control characters that identify breaks (e.g., paragraph breaks, page breaks, and the like) in the document to be visible when the document is rendered. For example, paragraph breaks can be represented as "\n" and may be included at the end of the paragraph with which it is associated. In some implementations, the one-dimensional string may also include identity identifiers that point to objects (e.g., lists, tables, images, and the like) that are external to the model 102. For example, the content may be integrated into the document when the document is rendered.

The style and entity portion 114 can include an ordered set of model changes associated with the model 102. In some implementations, the model changes included in the style and entity portion 114 may correspond with changes to formatting styles applied to the document, and changes to entities embedded within the document. For example, the model changes can be stored in a sparse map that includes markers that correspond to the changes, or mutations, and pointers to the one-dimensional character string. The pointers, for example, can define locations along the character string at which style changes are to occur, and at which embedded entities are to appear.

In some implementations, the model changes included in the style and entity portion 114 may be used to build a reverse map of the model 102. For example, data associated with the model 102 may be stored in the model changes, and the changes may be used to build the one-dimensional character string, the styles, and the entities. As another example, the model changes may be used to undo a change, or to undo a series of changes.

For purposes of illustration, a series of example user interactions with the application web browser 104 are described here for creating and modifying an online word processing document. Using browser chrome 118, for example, the user can navigate to a web page associated with the word processing document. Document chrome 120 that includes controls to enable the user to interact with a document can be downloaded by the browser 104 and presented to the user. To add content, for example, the user can type a series of characters (e.g., "The rain in Spain falls mainly on the plain.", followed by a carriage return) using the keyboard 108. The controller 108 can intercept the keystrokes, and can progressively update the model 102. The layout engine 110 may then render the model 102 and model updates, for example, enabling the web browser 104 to visually present the rendered model 102 in a document content section 122.

Using a selection tool (e.g., the keyboard 108, or some other input device), the user can select a control (e.g., a command button or menu option) displayed in the browser chrome 120 corresponding with centering the paragraph. The controller 106 can intercept the command and apply the corresponding style change to the model 102. The change may then be visually presented to the user in the content section 122, for example. Next, using a selection tool, the user may select a range of characters included in the document text (e.g., the word "rain"), and using the browser chrome 120 may apply a style change (e.g., bold). Similar to previous model changes, for example, the change may be applied to the model 102, rendered, and presented to the user. Next, for example, the user may insert an image into the document by selecting a desired image location within the document (e.g., by clicking the location with a mouse or by using some other input device), then selecting a control included in the browser chrome 120 associated with image selection (e.g., an "insert" pull-down menu). Upon specifying the image to be inserted (e.g., a graphics file depicting rain), the change may be applied to the model 102, rendered, and presented to the user.

The user may perform any appropriate number of additional document changes, such as adding text, deleting text, editing text, applying style changes, and adding, removing, and modifying entities, to name a few possibilities. Generally, the changes may be added to the model 102, rendered by the layout engine 110, and visually presented to the user in the document content section 122.

The items in the document content section 122 may each be delivered as synthetic representations of their model counterparts. In particular, each item may be mapped in x,y space onto a canvas in the document content section, and may not include separate underlying functionality or meaning. Rather, the application may keep track of the current location of a cursor being displayed in the document content section 122 and being moved by the view and the controller 106 based on user input. The cursor itself may be synthetic, such as in the form of an HTML image element selected to look like a standard cursor representation.

In this manner, the system 100 may provide for a rich user, near-WYSIWYG experience, in a browser-based application. The system 100 may also provide a simple document model that can be served conveniently over the internet. Also, the model local to a client device and a separate but corresponding model on a server system may be managed and updated independently at a server system and at separate client systems that are simultaneously accessing the model, though each component may apply matching rules for modifying the model so that they all stay in synchronization.

FIG. 1B shows a schematic view of a displayed document 130 and a data model 132 for representing the displayed document 130. In some implementations, the displayed document 130 may be presented by a web browser such as the web browser 104 (shown in FIG. 1A), and operations performed for updating and rendering the data model 132 may be generally similar to operations performed on the document model 102 (also shown in FIG. 1A) discussed above. For example, the document 130 may represent a visual rendering of the data model 132 by the system 100.

As shown in FIG. 1B, the data model 132 can include characters, styles, and entities. Characters, for example, may be stored in a one-dimensional string 134, and may include text characters and special reserved characters for marking the positions of breaks and embedded entities. Styles, for example, may include properties that apply to text characters and paragraphs. Entities, for example, may include references to external objects that can be included in the document 130.

To generate the document 130 from the data model 132, one or more characters in the one-dimensional string 134 may be initially identified. Next, for example, a sparse map of styles associated with the string 134 may be searched for style markers that apply to a span of characters that covers the identified character(s). By applying to the character(s) formatting that corresponds to style markers found to apply to the span of characters, the document 130 may be generated and presented (e.g., within a browser application) to the user.

The data model 132 includes several types of runs. Generally, a run may indicate a change at the index at which it is assigned. In some implementations, runs may be applied to a span of characters. In some implementations, runs may be applied or tethered to a particular character. Determining a run for a particular index or character in the one-dimensional string 134 may include searching backwards through the string to find the nearest run. In some implementations, the runs may be optimized by using the sparse maps to map a run to an associated logical address. For example, sparse maps may enable shifting of runs as characters are inserted or deleted, and as the index at which a run may be applied changes.

The data model 132 in the present example can include a text style run 136. To generate the corresponding portion of the document 130, the one-dimensional character string 134 can be traversed using pointers in the sparse map that are mapped to the string 134. For example, a particular formatting style may be applied between a pointer that activates the formatting, and another pointer that deactivates the formatting. In the present example, by applying the text style run 136 to the data model 132, the corresponding style (e.g., bold, 18 pt. font) may be applied to the character span "see". As shown in the rendered document 130, the corresponding characters appear bold and in an 18 pt. font. In some implementations, the applied text style run 136 may be adjusted to expand or contract with characters added to or removed from the one-dimensional string 134 between the activating pointer and the deactivating pointer. For example, upon receiving input between the activating pointer and the deactivating pointer, the location in the one-dimensional string 134 to which the deactivating pointer points may be adjusted by an integer number that is equal to the number of characters in the user input. In the present example, if the user enters additional characters between the "s" and the second "e," the corresponding text style run 136 can be expanded to grow with the additional characters, and the corresponding style can be applied to all of the characters between the two pointers.

The data model 132 in the present example can also include an image entity 138. For example, an object 140 (e.g., a flag image) can be outside of the data model 132, and can be represented in the one-dimensional string 134 by an identifier (e.g., a pointer). For example, the object 140 may exist on a server accessible by the Internet, or on a local drive, or some other location. To generate the portion of the document 130 corresponding with the object 140, the identifier for the object 140 can be located, the object 140 can be accessed, and the object 140 object can be rendered into the document 130. In some implementations, digital images may be rendered into the document 130 by placing an anchor point for each of the images between characters in the document where a corresponding identifier for the image is located in the one-dimensional string 134.

The data model 132 in the present example 132 can also include a paragraph style run 146. For example, the paragraph style run 146 may be tethered to a particular character (e.g., a "\n" character associated with a paragraph break indicated by the user) in the one-dimensional string 134. Rather than being associated with a position in the string, for example, the paragraph style may be correlated with the particular "\n" character. As shown in the rendered document 130, the corresponding character can trigger the creation of a paragraph break when the document is generated. In the example of items like paragraph breaks, the entire item can be represented in the one-dimensional string and need not include information in the sparse style map, though other items in the sparse style map may point to the characters that implement the paragraph mark or to the position in the one-dimensional string of those characters.

In the present example, the data model 132 can also include a list style run 142. For example, the list style run 142 may be tethered to a set of markers (e.g., a markers tethered to specific "\n" characters) in the one-dimensional string 134. In the present example, the list style run 142 may be associated with a list entity 144 included in the data model 132. For example, the list entity 144 may include nesting and indentation information for the corresponding list. Additionally, in the present example, the data model 132 can include a table style run 148 including cell style runs 150A and 150B. For example, the table style run 148 and the cell style runs 150A, 150B may be tethered to markers, and may enable the document 130 to display model data in a tabular format.

In some implementations, the document 130 may be rendered from the data model by 132 by applying changes to the one-dimensional string 134, style changes, and model changes in the order in which they occur (e.g., by storing and maintaining a list of changes made by one or more users). In some implementations, runs may be applied to the one-dimensional string 134 sequentially. For example, the one-dimensional string 134 may be accessed from the data model 132, and the various runs (e.g., the text style run 136, the image entity 138, the list style run 142, etc.) can be used for rendering the document 130 as the runs apply to portions of the document accessed by one or more users.

Figure 2A:
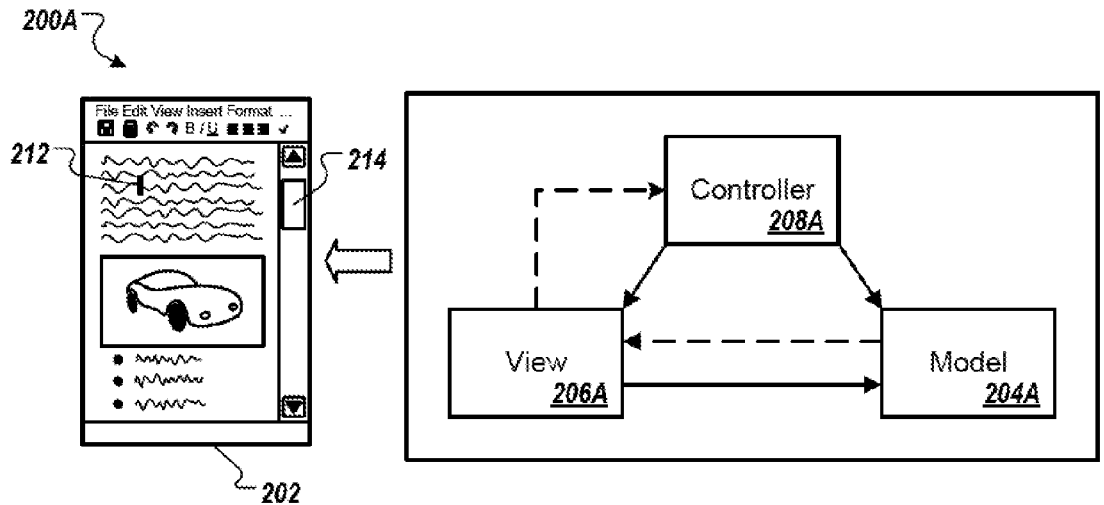
FIGS. 2A and 2B are block diagrams showing components of a model-view-controller implementation of a word processing application.
Figure 2B:
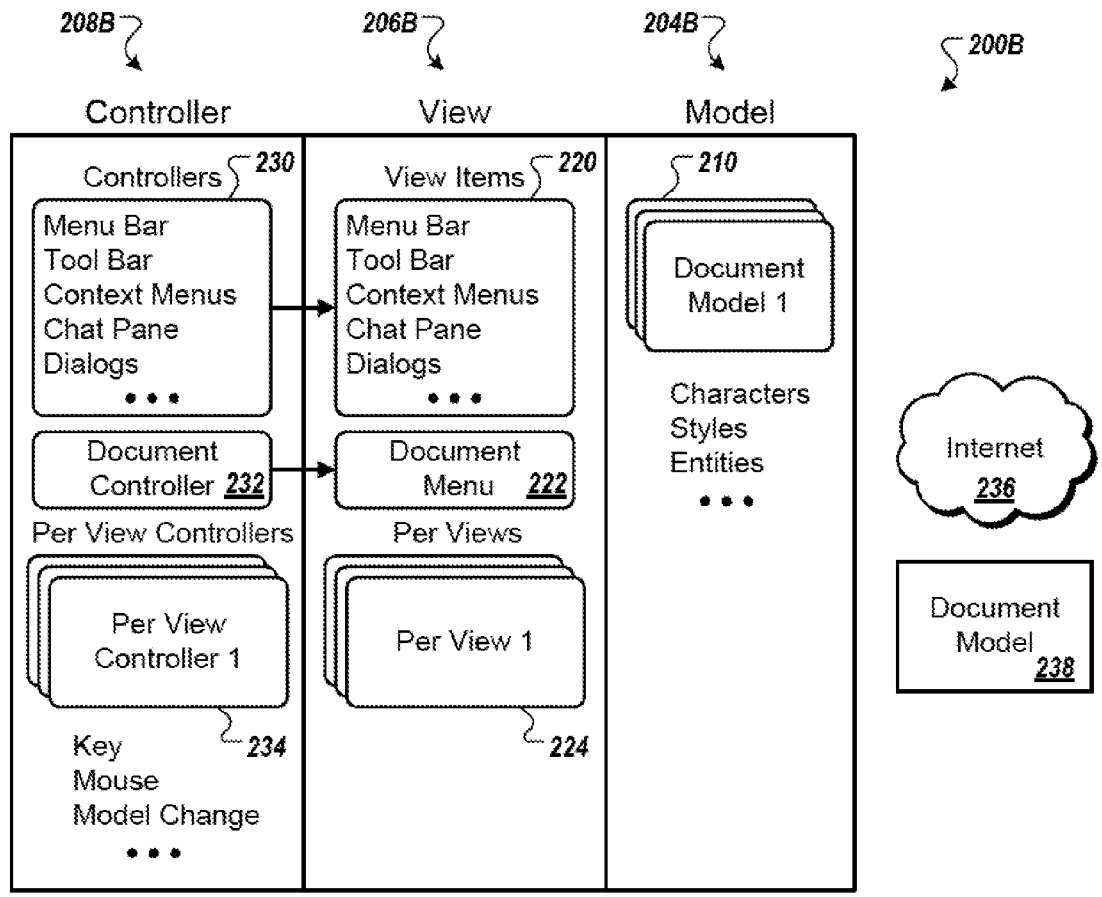

FIGS. 2A and 2B are block diagrams showing components of a model-view-controller (MVC) implementation of a word processing application. The word processing application, for example, may be executed by a web browser, such as the browser 104 shown in FIG. 1A. In general, the MVC implementation provides for the download of a model from a remote server to a client, and the rendering of the model into a DOM to form a view of the model that may be managed directly by the web browser. The controller may intercept actions, such as clicks on icons and keystrokes on a keyboard, and may cause such actions to be implemented, such as by adding typed characters both to the model on the client and on the remote server (e.g., uploading changes or mutations back to the server, which may be programmed with rules for integrating the mutations into a master model, so that the client-side model matches the master model as the user works).

Referring to FIG. 2A, a computer application 200A may be configured to display a word processing document 202. The application 200A includes, controls, or accesses a model 204A, a view 206A, and a controller 208A. For example, the model 204A can contain a representation of the state of the word processing document 202, including such elements as character data, formats, styles, paragraphs, sections, breaks, lists, tables, images, formulas, and the like. The view 206A can represent a rendering of the current state of the model 204A. For example, the view can provide a visual representation that combines the substance of the document (e.g., its raw text) with formatting and layout information. The view, when displayed by a browser, provides a form of, if not an exact, WYSIWYG representation of the document that is defied by the model.

In addition to the rendering of the model, the view 206A can be used for presenting to the user visual information that is associated with the word processing document 202, such as visible user controls for the application (i.e., chrome) and other word processing data. The controller 208A can respond to changes in the model 204A or the view 206A, and can update the state of the model 204A and the view 206A. As shown in FIG. 2A, solid lines between the model 204A, the view 206A, and the controller 208A represent direct references between components, and dashed lines represent listeners. For example, listening for user interaction (e.g., provided by user controls) with the presentation of the view 206A, the controller 208A can modify the model 204A, and can in turn modify the view 206A either directly or indirectly (by causing the view 206A to obtain new model data and render that new data).

As another example, listening for changes in the model 204A made by another user in a collaborative environment or changes made through an automated data update or another such process, the view 206A can request re-rendering of an updated model or portion of the model. For example, if a user of a client device is only one of multiple users concurrently editing a document, characters and other edits by the other users may be passed to the client device from the server system (and edits by the first user may be passed from the client device to the server system), and the client code may add characters to the model in near real-time, and those changes can be passed into the DOM (e.g., via rendering by the view 206A)—so that each user can see the edits made by the other users very quickly.

Referring to FIG. 2B, the model-view-controller implementation as presented in FIG. 2A is shown with additional detail. As shown, a computer application 200B (corresponding with the application 200A) includes, controls, or accesses a model 204B (corresponding with the model 204A), a view 206B (corresponding with the view 206A), and a controller 208B (corresponding with the controller 208A).

The model 204B can include one or more document models 210. Each of the document models 210 can represent a separate document in a collection of word processing documents, for example, and each of the models 210 can include elements such as characters, styles, and entities. Other forms of documents such as spreadsheet documents may also be represented. Model data and elements may be provided by a master document model 238 that is stored on a remote server system via a connection to a network 236 (e.g., the internet).

Generally, document text in the models 210 is associated with a series of characters. For example, the characters may represent raw text for the word processing document 202, and may also include certain reserved control characters such as characters that indicate the occurrence of a break (e.g., a paragraph break, a page break, or the like). In some implementations, each of the document models 210 can include a one-dimensional character string that includes document characters in an order in which they appear in the document.

Styles may be used to store information related to the presentation of document text (e.g., the series of characters). For example, text styles may include character formatting attributes such as font, font size, bold, italics, underline, foreground and background colors, alignment, and other such attributes. In some implementations, styles included in each of the document models 210 can be stored in a sparse map. For example, the sparse map can include markers that correspond to changes in styles in the document and pointers to positions in the character string. The pointers, for example, can define style runs between matched markers by specifying locations along the character string at which style changes occur. In some implementations, the markers in the matched set may be arranged to be tethered to certain characters in the one-dimensional character string. For example, if text is added between two paired markers, the pointer for one of the markers may shift by an integer equal to a number or characters associated with the added text.

Entities in each of the models 210 may be used to store information related to objects outside of the document models 210, and may be pointed to by references in the model such as in the one-dimensional character string. For example, entities may include objects such as lists, tables, images, and the like. In some implementations, the references can include object identifiers and pointers to the one-dimensional character string (e.g., from the sparse map) indicating where in the character string the object should appear, or identifiers from within the character string that point to the entities and mark the locations at which the particular entities are to appear in the document when it is rendered and displayed. For example, an image that should appear between two paragraphs may be associated with a special character appearing in the character string after a paragraph marker for one paragraph, and before the first character of the next paragraph.

The view 206B can generate one or more view items 220 that may enable the user to interact with the application 200B, such as menu bars, tool bars, context menus, chat panes, dialogs, other chrome, and the like. The view 206B can also include a document menu 222 that presents information and control options related to one or more of the document models 210, and one or more of a set of per views 224. For example, one of the per views 224 may be associated with a corresponding one of the sheet models 210. Each of the per views 224 may include components or controls such as selectors (e.g., cursors, selection indicators, and the like) navigation tools (e.g., scrollbars, document maps, outlines, and the like).

The controller 208B can include one or more controllers 230 that may listen for and handle user interactions with one or more of the view items 220. In some implementations, each of the controllers 230 may be associated with a corresponding one of the view items 220. For example, menu bar controllers may listen for and handle user interactions with menu bar view items (e.g., relating to various actions that a user would typically take from a row of menu selections), tool bar controllers may listen for and handle user interactions with tool bar view items, context menu controllers may listen for and handle user interactions with context menu view items, and so forth. The determination that a particular event has occurred may cause a particular controller 230 to execute predetermined code or otherwise carry out a predetermined process, such as by updating a local model when a key press is received and uploading information about the key press to a central server system.

The controller 208B can also include a document controller 232 that may listen for and handle user interactions with the document menu 222. In addition, the controller 208B can include a set of per view controllers 234, where each of the controllers 234 is configured to listen for and handle user interactions with a corresponding view in the set of per views 224. Each of the per view controllers 234 may include various controller types, such as key controllers for intercepting and interpreting keyboard input, mouse controllers for intercepting and interpreting mouse input, and model change controllers for intercepting and interpreting model change events.

Generally, the controllers included in the controller 208B can transform user-generated events into model and view mutations. For example, based on a user action, a relevant controller (e.g., a controller configured for handling the action) may receive one or more events associated with the action and make transient changes to the view 206B before the user action is committed. Then, based on the event properties, the relevant controller can construct a command to mutate the model 204B, execute it, and send the updated model or just data for the particular mutations to the remote server system that hosts the document model 238 via the network 236.

The controllers may also use timers or other mechanisms to aggregate inputs or mutations, so as to lower the number of updates that need to be made to the local or server-based models. For example, the controllers may implement changes to the local and/or server-based model in batches that occur within predefined time windows, such as by waiting 200 ms after an initial keystroke is sensed before sending to the central server system data about all keystrokes received in the time window.

Many possible user interactions with the application 200B are possible, including interactions that are included in single-user sessions and in multiple-user sessions. For purposes of illustration, a series of example user interactions with the application 200B are described here. For example, to enter text into the word processing document 202, the user may proceed by using a computer mouse to select a desired document location 212 for text insertion by clicking on the document 202. A mouse controller that is included in the per view controllers 234 (e.g., a per view controller associated with the active document 202) can listen for an event that is associated with the mouse positioning input and the mouse click input, and upon intercepting it, can modify the view 206B (e.g., a per view associated with the active document) to provide the user with a visual indicator for the selection (e.g., a cursor). For example, the selected location 212 may be associated with a visible cursor (where the cursor is a graphical HTML element such as an image, and is displayed at an appropriate location on a canvas where the document is also being displayed so as to create a synthetic presentation that makes the graphical element look like a true cursor), may be highlighted, or may receive another such modification. Additionally, the selected location 212 may also be associated with a location in the model 204B. For example, a position in a one-dimensional character string included in the document models 210 can be determined, based on the selected location 212.

Using a keyboard, the user may enter desired text at the document location 212. A keyboard controller that is included in the per view controllers 234 can listen for events associated with the keyboard input, and upon intercepting them, can modify the view 206B to provide the user with a visual indicator for the input. For example, as the user types text at the location 212, the document 202 may be visually updated to present the text to the user. Additionally, the keyboard controller can modify the model 204B to include entered text by copying the user input to the model. For example, a one-dimensional character string included in the document models 210 can be updated to include the entered characters. Additionally, the document model 238 may be updated to include the entered text, thus coordinating the model 204B with the document model 238. For example, changes to the model 204B may be transmitted to the document model 238 via a connection to the network 236. In some implementations, changes may be sent periodically (e.g., once every 100 milliseconds, once every 200 milliseconds, once every 500 milliseconds, once every second, once every 2 seconds, or another appropriate time interval). In some implementations, changes may be sent based on user activity (e.g., entering a paragraph break, applying a formatting change, navigating to another document section, clicking a save button, or some other action).

As another example, the user may insert an entity (e.g., a list, a table, a hyperlink, an image, or another such object) into the document 202. For example, the user may proceed by using a computer mouse to select a desired document location (e.g., the location 212) for entity insertion by clicking on the document 202. Similar to interactions associated with text entry, for example, a mouse controller included in the per view controllers 234 can listen for an event associated with the mouse positioning input and the mouse click input, and upon intercepting it, can modify view 206B to provide the user with a visual indicator for the selected location. Next, for example, the user may specify the entity for insertion by interacting with one of the view items 220 or with the document menu 222. For example, the user may make a selection on a menu bar to indicate an intent to insert an image. A dialog associated with image selection may be presented to the user, enabling the user to select the desired image.

Model-view-controller interactions for adding the entity within the application 200B may operate in a similar manner as when a user is entering text. For example, as the user inserts the image at the location 212, the document 202, as it is displayed on an editing surface, may be visually updated to present the image to the user. Additionally, the model 204B may be modified to include a reference to the inserted image by writing the reference to the model. For example, one of the document models 210 (e.g., the model associated with the active document) can be updated to include a reference to the inserted image. A one-dimensional character string may be updated to include a special character indicating the position of the image, and the reference to the image may be stored.

When the document 202 is rendered from the model associated with the active document, for example, the image content may be integrated into the document 202 that is displayed to the user. In some implementations, the one-dimensional character string may include multiple instances of an identifier for a single entity. For example, the image may be positioned at multiple locations in the document 202, specified by multiple positions for the identifier in the one-dimensional character string. Thus, a single external entity may be shared within a document, or may be shared among multiple documents—both by common references to the external entity. The document model 238 may be updated to include the inserted image(s), thus coordinating the model 204B with the document model 238. For example, changes to the model 204B may be transmitted to the document model 238 via a connection to the network 236.

Additionally, for example, the user may modify the formatting of text and entities presented in the document 202. By interacting with one of the view items 220 or with the document menu 222, the user can indicate a desired formatting change (e.g., a change such as changing a font of a selected text block to bold, changing a group of words to be organized as a list, changing a paragraph justification to be right-aligned, changing a document line spacing to be double-spaced, and the like). One of the controllers 230 or the document controller 232 can listen for user interaction with the view 206B, and upon detecting the interaction, can modify the model 204B to include the formatting change. For example, one of the document models 210 (e.g., the model associated with the active document) can be updated to include an element in a sparse map of styles defining the formatting change, and defining the locations along the one-dimensional character string at which the changes in style are to occur. A model change controller included in the per view controllers 234 can listen for events associated with the model 204B and can send a request to the view 206B to update accordingly (e.g., by rendering a display of formatted text). In some implementations, the model change controller may also handle model change events that result from collaborative model changes.

In some implementations, a document model that is one of the document models 210 may include a subset of the document data from the document model 238. For example, if the document model 238 is substantially large, a subset of the data (e.g., a subset associated with a portion of the document that is currently viewable by the user, plus perhaps a buffer area around the currently viewable area, or viewport, so that small scrolling distances may be handled by normal browser interactions without a need to render additional content form the model) may be provided to each client that is currently displaying the word processing document 202. As another example, the full document model 238 may be provided to each client.

The user may elect to view a different portion of the word processing document 202 than the user is currently viewing in the web browser. For example, by interacting with a scrollbar 214 that is associated with the document 202, the user may indicate an intent to view document data beyond the current viewport, or displayed area. One of the per view controllers 234 (e.g., the per view controller associated with the active document) can listen for user interaction with the view 206B or other appropriate component (e.g., the visual portion of the scrollbar 214), and upon detecting the interaction (e.g., via a computer mouse), can request for the view 206B to redraw itself.

If the user specifies a small amount of scrolling, the view 206A may cause itself to be displayed by the browser. For example, a buffer area of document data may be maintained in the model 204B (already rendered into a DOM) around the data that is displayed in the visible area of the document 202. If the amount of scrolling specified by the user is determined by the view 206B to be within the bounds of the buffer area of data, the document display may be updated using such pre-rendered data. If the user specifies a larger amount of scrolling, such that the scrolling specified by the user is determined by the view 206B to be outside of the bounds of the pre-rendered buffer data, for example, additional document data from the document model 238 may be downloaded via the network 236. Thus, the model 204B may be updated with information that is related to additional document sections, and the document may be rendered using the downloaded data.

Figure 2C:
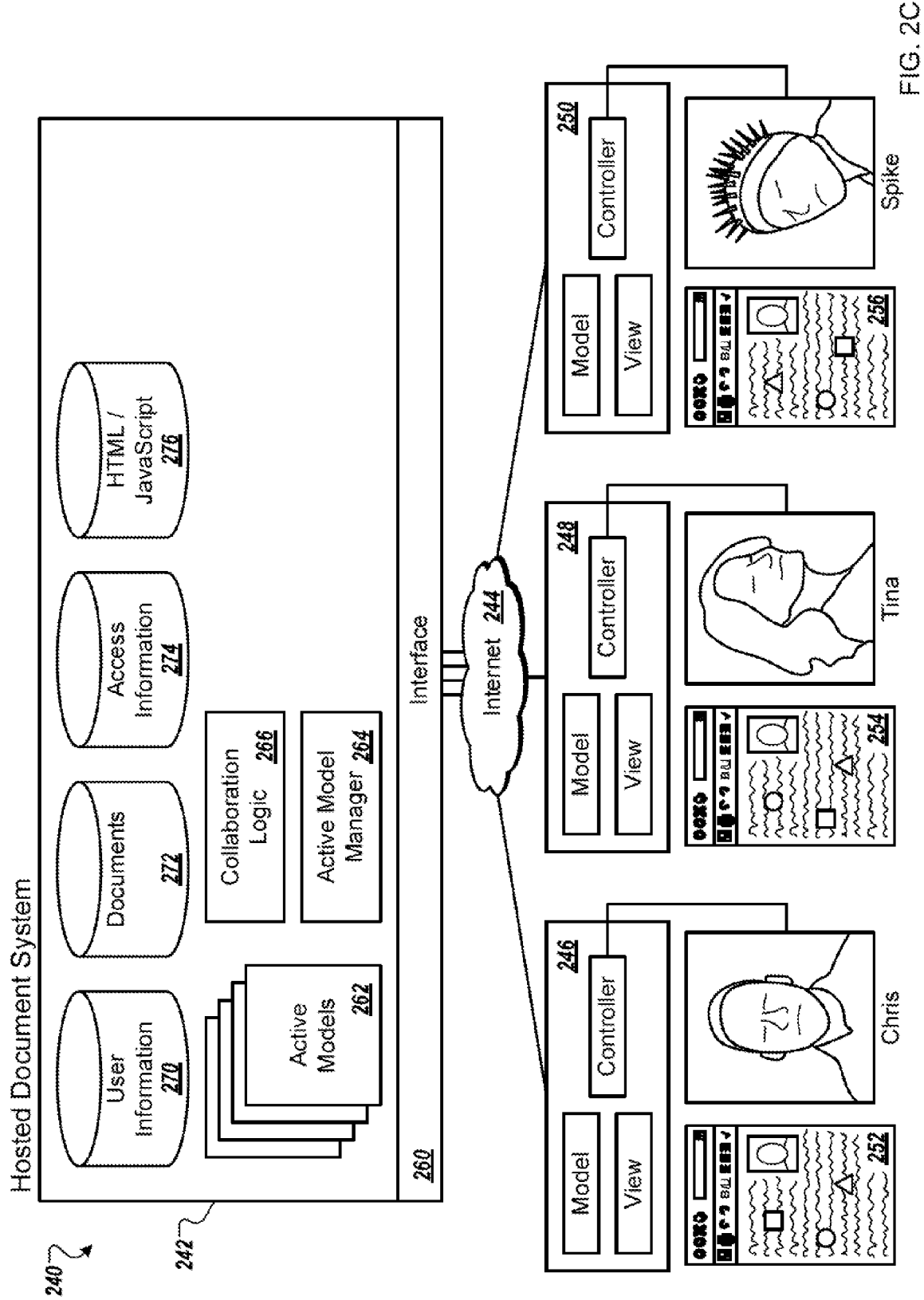
FIG. 2C is a block diagram of a system for permitting collaborative editing of a document by multiple users through a hosted server system.

FIG. 2C is a block diagram of a system 240 for permitting collaborative editing of a document by multiple users through a hosted server system. In general, the system 240 includes a hosted document system 242 executed by one or more computer servers (e.g. a server farm). The hosted document system 242 can provide document hosting services to any number of client users via connections to a network 244 (e.g., the internet). Using the document system 242, client users may create new documents, modify existing documents, share documents, and collaboratively work on documents with other users.

For purposes of illustration, document hosting services may be provided to browser applications 246, 248, and 250. Each of the applications may be executed by a web browser (e.g., by the browser 104, as shown in FIG. 1), and may include model, view, and controller components (e.g., similar to the application 200, shown in FIGS. 2A and 2B). The applications 246, 248, and 250 may be configured to execute computer code (e.g., JavaScript and other code running in a web browser) to display a word processing interface and to perform word processing functions associated with one or more documents served by the hosted document system 242.

As shown in the present illustration, Chris can interact with a web browser 252, Tina can interact with a web browser 254, and Spike can interact with a web browser 256. Each of the browsers 252, 254, and 256 may access any appropriate number of browser applications (e.g., embedded applications, widgets, web services, and the like). For example, browser 252 can access application 246, browser 254 can access application 248, and browser 256 can access application 250.

By interacting with controls presented by the web browsers, for example, users of the system 240 (e.g., Chris, Spike, and Tina), can work with one or more documents that are managed and provided by the hosted document system 242. For example, the users may access existing documents provided by the system 242 or may create new documents. Each of the browser applications 246, 248, and 250 can communicate with an interface 260 of the document system 242 via the network 244. For example, communication between the browser applications 246, 248, and 250 and the interface 260 may include HTTP (HyperText Transfer Protocol) requests, SOAP (Simple Object Access Protocol) messages, or some other appropriate such protocol. In some implementations, client browsers may maintain browser channel connections to the interface 260 for communicating session data between clients and the document system 242.

The hosted document system 242 can include sub-components for storing and managing information related to system users, documents, and browser applications. The various sub-components may be executed by the same computer server, or may be distributed among multiple computer servers. The sub-components may communicate with each other directly (e.g., via messages, transferred files, shared data, remote procedure calls, or some other protocol) or indirectly (e.g., by communicating with an intermediary application). Generally, sub-components included in the document system 242 can communicate with client applications (e.g., the browser applications 246, 248, and 250) via the interface 260.

The system 242 can also include one or more data stores for storing user information 270. For example, the user information 270 can include information associated with system users (e.g., Chris, Tina, and Spike). Such information may include general user information and login information (e.g., user names, passwords, e-mail addresses, and the like), information related to one or more devices employed by the users to access the system (e.g., IP addresses, browser versions, connection speeds, and the like), and system usage information (e.g., access times, amount of data accessed, and the like), to name a few possibilities.

In some implementations, the system 242 can include one or more data stores for storing documents 272 in the form, e.g., of document models like those discussed above and below. For example, the documents 272 can include word processing documents created, maintained, and accessed by system users. As another example, the documents 272 may be generated by an automated process, such as a news feed or another reporting process that is based on gathered data. Information associated with the documents 272 can include document data models, document text, document formatting information, entities (e.g., tables, images, videos, sound clips, or other such objects), and the like.

The system 242 can also include one or more data stores for storing access information 274. For example, the access information 274 can include information that can be used for controlling access of system users (e.g., users included in the user information 270) to system documents (e.g., documents included in the documents 272). Generally, system users may set access privileges for documents that they create or manage. For example, Chris may create a personal letter document and specify the document as being private. Thus, other users of the system (e.g., Tina and Spike) may be unable to locate or access the document, which may have access control limitations applied to it in various familiar manners. As another example, Tina may upload a schedule document and specify the document as being shared and as being viewable by Chris. Thus, Spike may be unable to locate or access the document, but Chris may be able to access the document in view-only mode. In some implementations, Tina, as the document creator, may retain full access to the document, having privileges such as the ability to add, edit, and delete content, having the ability to change privileges, and having the ability to remove the document from the system 242. As another example, Spike may create a document related to a group project and specify Chris and Tina (and himself) as having full access privileges. In some implementations, user groups may be included in the access information 274. For example, a user may create a group and may add one or more users to the group. Rather than select individual users when assigning document permissions, in some instances, users may select a group including the users. The access information 274 may also include such information as the user ids of document users, document access times, and the like.

In some implementations, the system 242 can include one or more data stores for storing HTML/JavaScript 276. For example, the HTML/JavaScript 276 can include application code for executing the browser applications 246, 248, and 250. The application code may be provided to any of the browsers 252, 254, and 256, for example, when browser users access a web site associated with the hosted document system 242. Upon receiving a request for any of the documents 272, for example, the system 242 may provide the HTML/JavaScript 276 in addition to one or more of the documents 272. Using the HTML/JavaScript 276, the browser applications 246, 248, and 250 may render the document data and may provide an interface that enables browser users to interact with the documents. In some implementations, technologies other than HTML and JavaScript may be used for providing application code. For example, for web browsers including an appropriate plugin, another type of compiled or interpreted code may be provided.

Many possible user interactions with the system 240 are possible, including interactions in single user sessions and in multiple user sessions. For example, in a collaborative editing session, multiple users may simultaneously interact with a document. Although the applications used for editing the document may each behave independently, the applications may follow the same editing rules for updating and rendering the document model. Thus, multiple users may have similar experiences with the document, and may work together to produce a similar document model.

In an example session, to initiate collaborative word processing document editing, Chris accesses the hosted document system 242 by directing the web browser 252 to a web site (e.g., a domain) that is associated with the system 242. Receiving login information from the browser 252, the system 242 can verify Chris's information against the user information 270. Upon verification, the system 242 can provide HTML/JavaScript 276 to the browser 252 for executing an online word processor (though certain of the code may be passed before verification occurs). The browser can include a portion of the HTML/JavaScript 276 as the browser application 246, render chrome associated with the application, and display the application to Chris.

Chris may interact with the browser application 246 via a set of controls displayed in an application view within the browser 252. For example, Chris may indicate an intent to create a new document by clicking a button or selecting a menu option displayed in the application view. The application controller can intercept the command and pass the command to the interface 260 via the network 244. Receiving the command, the system 242 can add a new document to the documents 272, and add information associated with the new document to the set of active models 262. For example, the active models 262 may include model information associated with documents currently being edited by other users of the system 242.

A corresponding version of a model in the set of active models 262 may be present at the browser application 246. For example, Chris may add content and make changes to the word processing document provided by the view of the browser application 246, and the corresponding content and changes can be applied to a model that is accessed by the browser application 246 (and associated HTML and JavaScript code running in the browser), and may be propagated to the active models 262.

Chris may also share the document with one or more users. For example, using controls associated with the application 246, Chris may select Tina and Spike as users who may share the document, and he may assign both Tina and Spike full document privileges. For example, Tina and Spike may be included in a presented list of users commonly sharing documents with Chris, and Chris may select Tina and Spike from the list. As another example, Chris may provide the e-mail addresses of Tina and Spike. The system 242 can store the sharing information (e.g., user ids of other users having access to the document, permissions levels for the users, and the like) in the access information 274. In some implementations, the system 242 may send messages (e.g., e-mail, text messages, instant messages, and the like) to users who have received document privileges. In some implementations, users who have received document privileges may receive a link (e.g., a hyperlink or URL) to the shared document.

Upon receiving notification of the shared document, Tina and Spike may access the document using their web browsers 254, 256. For example, upon verification, the system 242 can provide HTML/JavaScript 276 to the browser 254, 256 for executing an online word processor. The browsers can include a portion of the HTML/JavaScript 276 as the browser applications 248, 250, can render chrome associated with the application, and can display the applications.

Additionally, an active model manager 264 included the hosted document system 242 can identify which documents are currently open by users of the system, and users who are active in the document (i.e., Chris), and can set up a collaborative session. For example, the active model manager 264 can determine that the document requested by Tina and by Spike is associated with one or more of the active models 262. The system 242 can then forward the document request to a computer hosting the document, and the computer can associate Tina and Spike with the current session. Additionally, the browser applications 248, 250 can download model data associated with the active model(s) 262, and render and display the downloaded model data. In some implementations, the system 242 can create model instances for Tina and for Spike and can add the instances to the active models 262.

In the present example, users may be able to view their own cursors as well as the cursors of other users in a collaborative session. For purposes of illustration, each user's cursor appears to himself/herself as a square. For example, Chris may view his own cursor as a square, and the other users' cursors as a circle or as a triangle. Correspondingly, Tina and Spike may also view their own cursor as a squares, and the other users' cursors as circles or triangles. In some implementations, the cursors may appear as a different color (which could not be shown here). For example, cursors may generally appear as underlines or vertical bars, where the cursors are different colors for each user.

In the present example, changes made by each of the users can be sent by the browser applications 246, 248, and 250 to the hosted document system 242, coordinated, and sent back to the other users. In some implementations, the changes can be sent at time intervals (e.g., once every 100 milliseconds, once every 200 milliseconds, once every 500 milliseconds, once every second, once every 2 seconds, or another appropriate time interval). In some implementations, sending can be based at least in part on user activity or inactivity. For example, during periods of user inactivity, changes may be sent or received less frequently than during periods of user activity. When a user is entering data or when a local user hovers over a cursor for another user, a pop-up label that identifies the other user may be displayed, so that the local user can identify who is making changes—though the label may then disappear so that it does not continue to block the document.

To coordinate multiple document changes made by multiple users, for example, the hosted document system 242 can include collaboration logic 266. For example, the collaboration logic 266 can be executed by one or more code modules executed by one or more computer servers associated with the system 242. In some implementations, portions of the collaboration logic can be executed by the browser applications 246, 248, and 250. Generally, the logic 266 can resolve data collisions (e.g., instances where multiple users edit the same document portion or apply conflicting document formats) by applying a consistent set of rules to all user changes. Although, in some instances, one or more users may be prompted to disambiguate a change. For example, if Tina makes a document change and Spike makes a conflicting document change before receiving Tina's change, Spike may be presented with a message from the browser application 250 including possible conflict resolution scenarios. In some implementations, one user may be identified as trumping other users in collision situations. Chris, as the document creator, for example, may be able to apply his changes over changes made by either Tina or Spike in cases of conflict. For example, if Spike edits a passage at the same time as Chris deletes it, the passage (including Spike's edits) may be deleted.

Thus, the system shown in FIG. 2C may handle collaborative editing of a hosted document by multiple users at one time. The management of such editing can involve a low amount of data passing between the various sub-systems in the system.

Figure 3A:
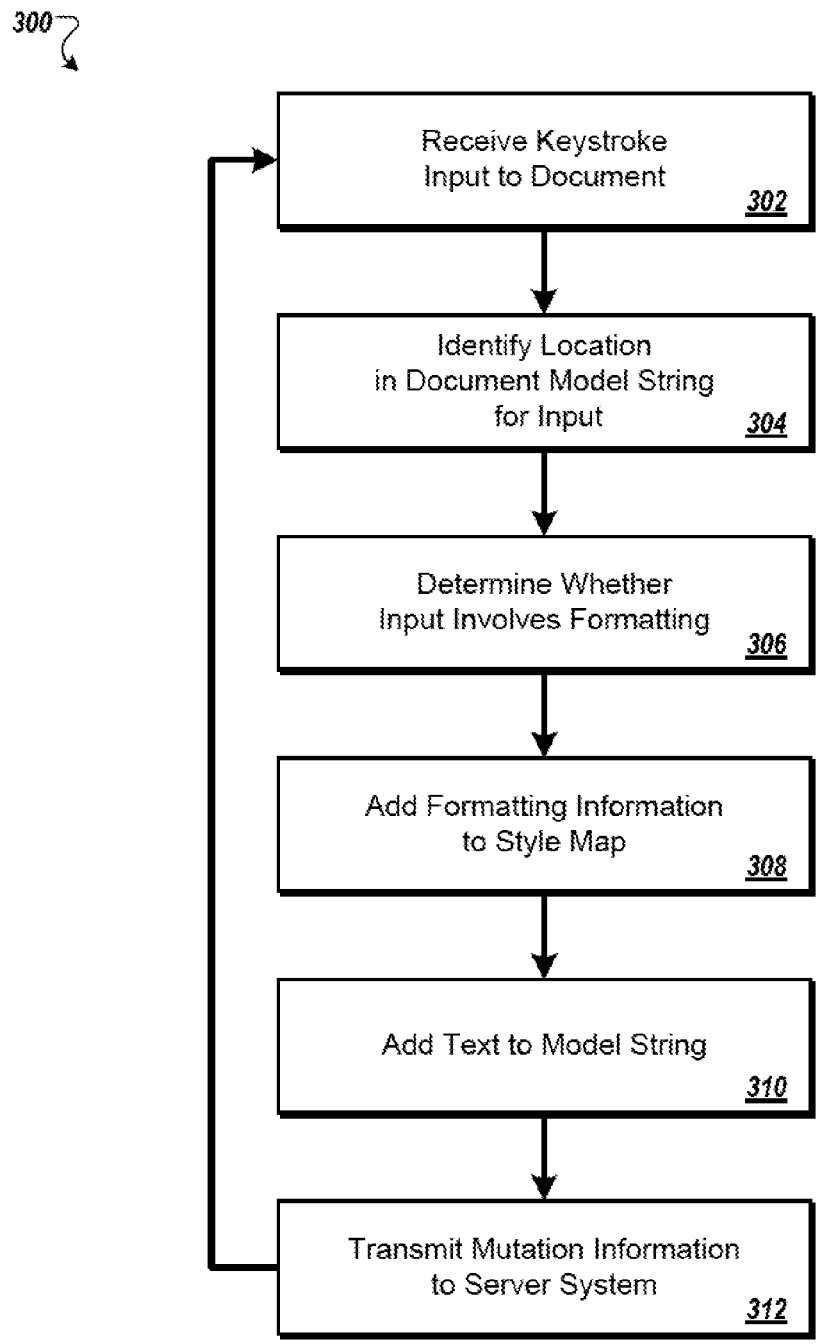
FIG. 3A is a flow chart of an example process for adding data to a document model.

FIG. 3A is a flow chart 300 of an example process for adding data to a document model. In some implementations, actions represented in the flow chart 300 may be performed by a computer-implemented system such as the system 100 shown in FIG. 1A, and will be described as such for clarity. Generally, the actions may be related to a user providing system input by typing on a keyboard (e.g., the keyboard 108). In some implementations, the actions may be performed for each keystroke. In some implementations, a timer can be used such that multiple keystrokes may be received in a time window, and the actions may be performed for multiple keystrokes in that window processed as a batch (e.g., processed on the client device itself, and also uploaded to a remote server system).

Referring to FIG. 3A, keystroke input to a document is received at box 302. For example, the user may interact with an online word processing document provided by an application executed by the browser 104. The document may be displayed as a synthetic combination of visual elements that do not have context that points back to the model, and keyboard input may be intercepted and processed by the controller 106, according to a determined location on a canvas where the document is being displayed that is correlated to a location in a one-dimensional character string in a model of the document.

At box 304, a location in a document model string is identified for input. For example, the document model 102 may include a one-dimensional string associated with textual document content, as well as special characters associated with breaks and with embeddable objects. To identify the location for input, for example, the controller 106 may determine the location of a user's cursor within the browser application providing the word processing document. Based on the location, for example, the controller 106 may determine a corresponding position within the one-dimensional string.

At box 306, a determination is made of whether the input involves formatting of text in the document. In some implementations, the user may interact with one or more controls associated with the document chrome 120 to specify one or more formatting styles to apply to the input. For example, the user may indicate that a bold style is to be applied to document text (e.g., after the user has dragged a pointer across the text to highlight certain characters). The controller 106 may detect the formatting indication and apply it to text as it is entered.

Formatting information is applied to a style map at box 308. For example, the controller 106 may update the document model 102 to include style map information, such as style attributes, and character locations associated with the style. At box 310, text is added to the model string. For example, the one-dimensional model string included in the document model 102 can be updated to include the entered text.

At box 312, mutation information is transmitted to a server system. For example, a master document model maintained by the server system may be updated to include the entered text information and the entered style information. In collaborative document editing sessions, for example, the entered information may be distributed to one or more other users concurrently working on the word processing document from other web browsers.

Figure 3B:
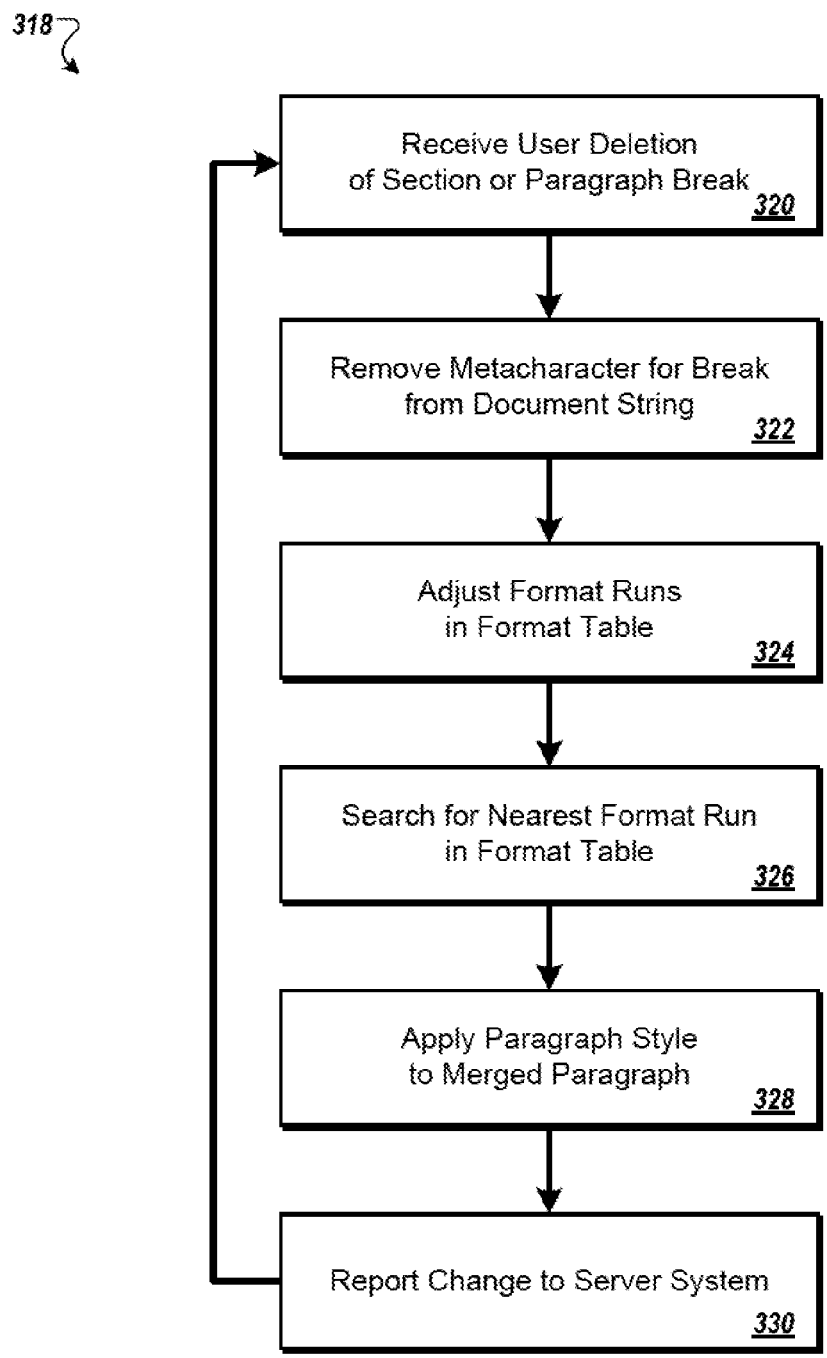
FIG. 3B is a flow chart of an example process for applying a paragraph merger to a document model.

FIG. 3B is a flow chart 318 of an example process for applying a paragraph merger to a document model. In some implementations, actions represented in the flow chart 318 may be performed by a computer-implemented system such as the system 100 shown in FIG. 1A, and will be described as such for clarity. Generally, the actions may be related to collapsing two paragraphs into one.

Referring to FIG. 3B, a user deletion of a section or paragraph break is received at box 320. For example, the user may interact with an online word processing document provided by an application executed by the browser 104. Using the keyboard 108, for example, the user may provide keyboard input indicating the removal of the section or paragraph break. For example, the user may position his or her cursor at the start of a paragraph and press the backspace key, indicating the deletion of the preceding paragraph break, or may perform some other equivalent action. The keyboard input may be intercepted and processed by the controller 106, for example.

At box 322, the meta-character associated with the break may be removed from a document string. For example, the document model 102 may include a one-dimensional string associated with textual document content, as well as special characters associated with breaks. In some implementations, breaks may be associated with a newline or carriage return ("\n") character. For example, one or more paragraph style attributes (e.g., alignment, indentation, line spacing, tab stops and the like) may be associated with or tethered to a particular newline character.

Format runs in a format table can be adjusted at box 324. For example, the format table may include any appropriate number of paragraph style runs associated with the one-dimensional string. Generally, paragraph style runs may be applied to textual content in the one-dimensional string preceding the character marker associated with the style run. After removing the deleted marker, for example, the nearest format run may be searched for in the format table (box 326). In some implementations, the format table may be searched in a backward direction for another paragraph style run nearer to the start of the table. Upon finding the format run, for example, at box 328, the paragraph style may be applied to the merged paragraph. For example, the paragraph below the deleted paragraph break may receive the formatting associated with the paragraph above the deleted paragraph break.

At box 330, the change is reported to a server system. For example, a master document model maintained by the server system may be updated to include the updated paragraph style information. In collaborative document editing sessions, for example, the updated information may be distributed to one or more other users concurrently working on the word processing document from other web browsers.

Figure 4:
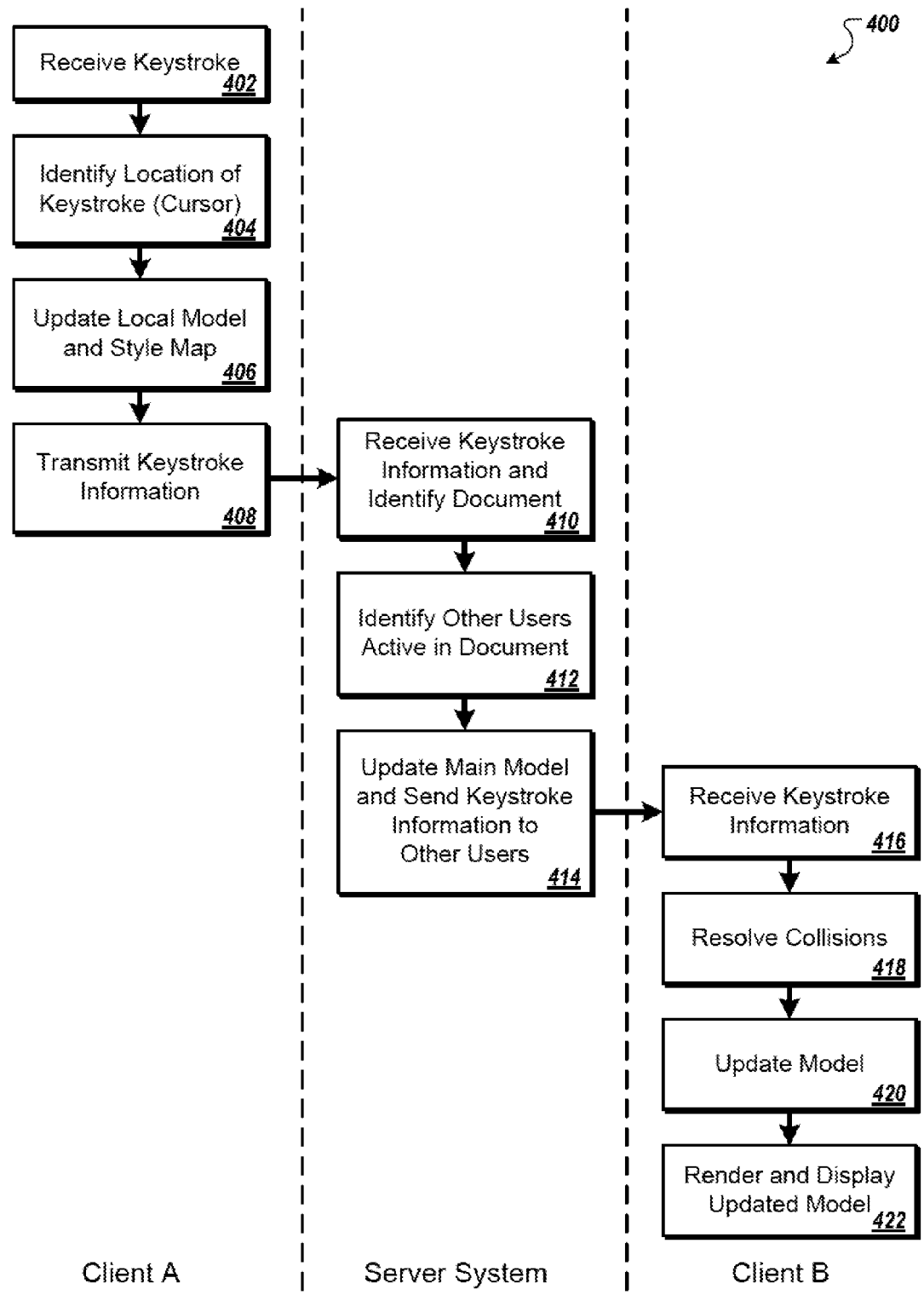
FIG. 4 is a flow chart of an example process for coordinating copies of a document model between multiple computers.

FIG. 4 is a flow chart 400 of an example process for coordinating copies of a document model between multiple computers. Generally, the actions may be related to synchronizing multiple client word processing applications used for editing a single word processing document during a collaborative editing session. For example, the actions can include passing information input by one client through a server to another client, and updating model information associated with the server and the other client.

Referring to FIG. 4, Client A receives a keystroke at box 402. For example, an application controller executed by Client A can intercept and process the keystroke. At box 404, Client A can identify the location of the keystroke. For example, by determining the position of the cursor within the word processing document being edited by a user of Client A, the controller can identify a corresponding position within the local document model. At box 406, Client A can update the local model and style map. For example, the application controller can insert information related to the keystroke at the identified position within the local document model. Additionally, the controller can update the corresponding style map to include style and formatting information related to the received keystroke.

At box 408, Client A can transmit keystroke information (e.g., character text and related style and formatting information) to the Server System. For example, the information may be transmitted via a connection to the Internet. At box 410, the Server System can receive the keystroke information and identify the document being edited by the user of Client A. For example, identification information associated with the document may be transmitted along with information related to document changes. Using the document identification information, the Server System can identify other users active in the document at box 412. For example, the Server System can maintain information about other clients editing the document (e.g., in one or more data stores). Additionally, for example, the Server System can maintain network connections with the other clients. Thus, the Server System can coordinate document editing sessions among multiple clients working with a hosted version of the document. At box 414, the Server System updates the main model and sends keystroke information to other users. For example, the Server System can maintain a model that may be provided to additional clients as the clients connect to the system. Additionally, for example, the Server System can save the model and provide the model to client users during future editing sessions.

At box 416, Client B receives keystroke information sent by the Server System. In the present example, the keystroke information may be substantially similar to the keystroke information transmitted by Client A at box 408. At box 418, Client B resolves collisions between received keystroke information and information associated with the document model version maintained by Client B. For example, if users of Client A and Client B modify related model portions at the same time, a data collision may be encountered by Client A, Client B, or both. By applying a defined set of rules for handling model updates and potential model collisions, for example, multiple clients collaboratively editing the word processing document may have similar editing experiences. At box 420, Client B can update its version of the document model, and at box 422, the updated model can be rendered and displayed to the user.

Figure 5A:
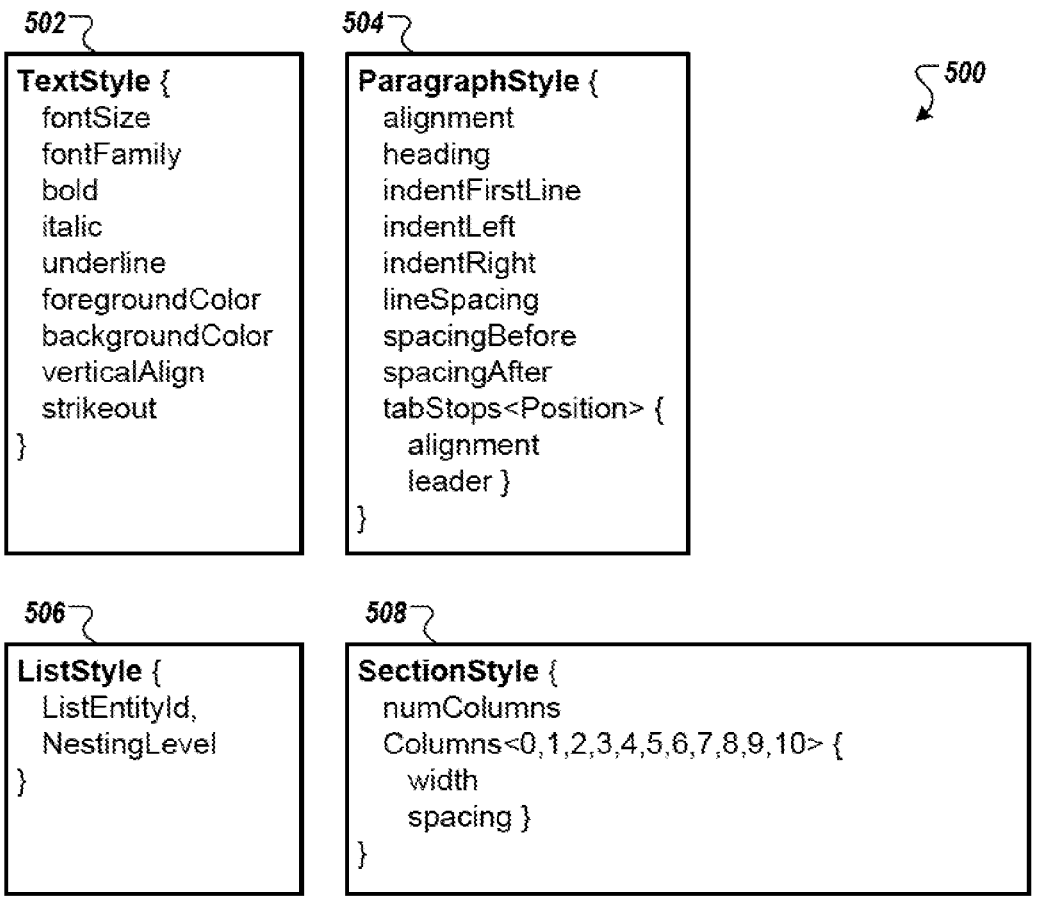
FIGS. 5A and 5B show examples of various styles and entities for rendering a document model.
Figure 5B:
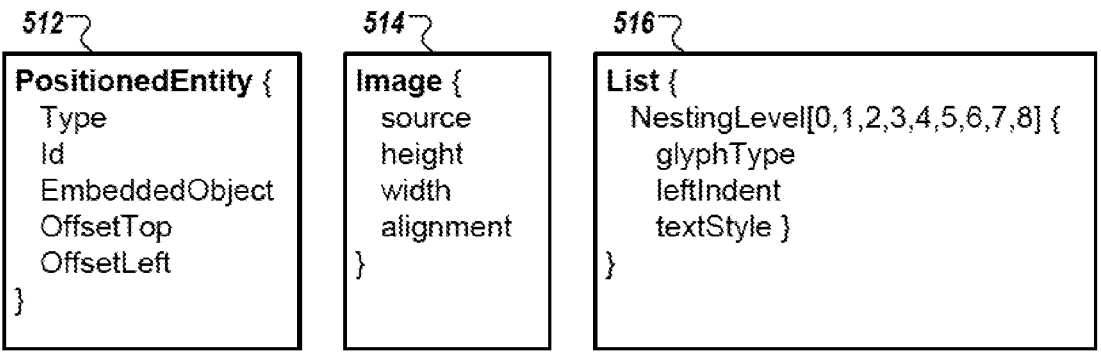

FIGS. 5A and 5B show examples of various styles and entities for rendering a document model. For example, the styles and entities can include attributes that may be applied to document content. In some implementations, the styles and entities may be applied by a computer application, such as the application 200 shown in FIGS. 2A and 2B.

Referring to FIG. 5A, various styles 500 are shown. For example, the styles 500 can include a text style 502, a paragraph style 504, a list style 506, and a section style 508. Generally, styles may be applied to document text (e.g., characters included in a one-dimensional string) in order to modify associated display characteristics.

Referring to FIG. 5B, various entities 510 are shown. For example, the entities 510 can include a positioned entity 512, an image 514, and a list 516. Generally, entities are addressable objects with properties that can be updated by the user. For example, an image entity can include updatable properties such as source, height, width, alignment, and the like. In some implementations, an entity may be associated with a unique identifier that may be stored as a hash map. Entities, for example, may also be associated with a character index to which they are tethered, or to a specific character to which they are tethered.

Figure 6:
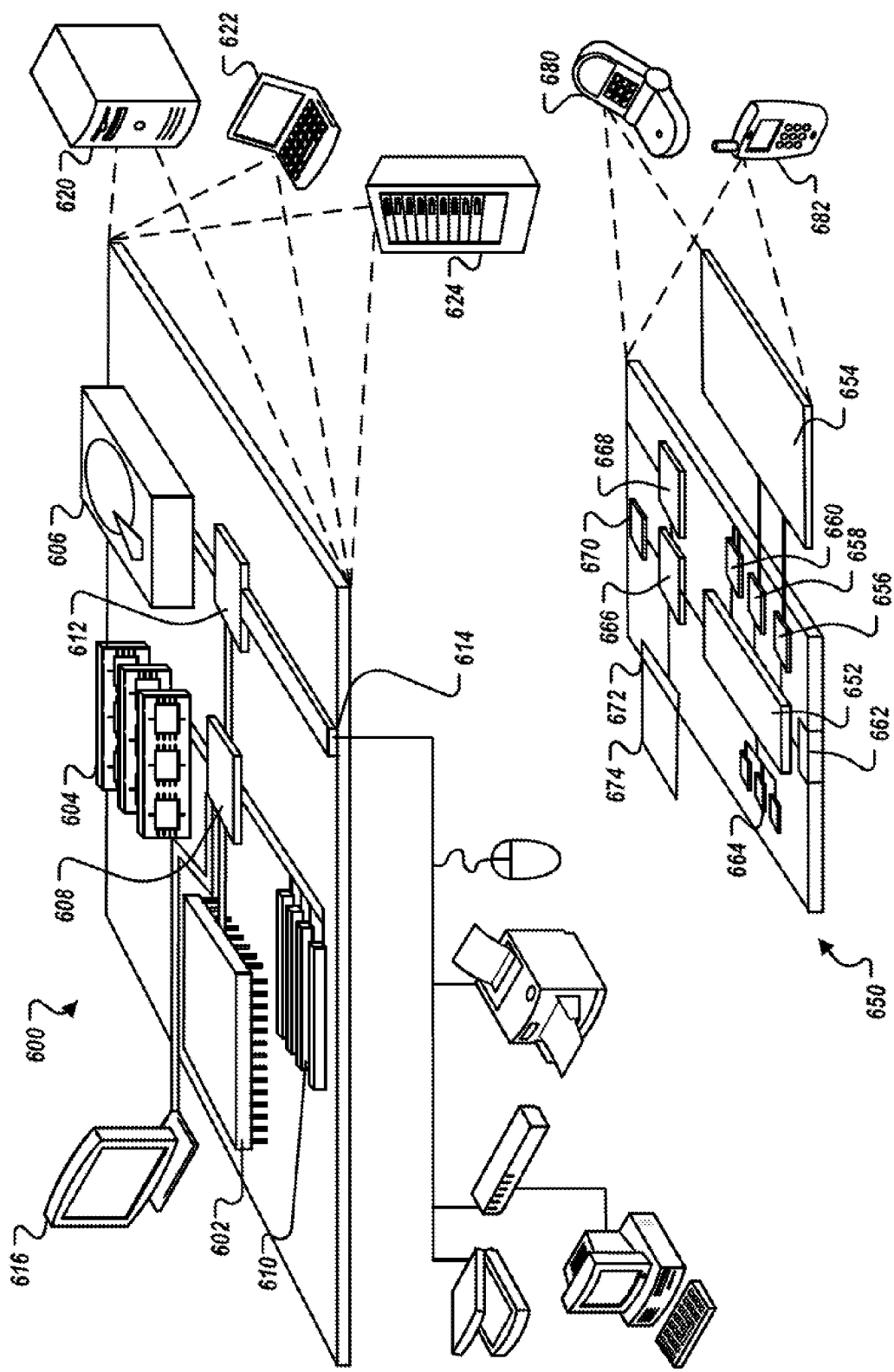
FIG. 6 shows an example of a computer device and a mobile computer device that can be used to implement the techniques described here.

FIG. 6 shows an example of a generic computer device 600 and a generic mobile computer device 650, which may be used with the techniques described here. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, memory on processor 602, or a propagated signal.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, memory on processor 652, or a propagated signal that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, much of this document has been described with respect to television advertisements, but other forms of future, viewership-based advertisements may also be addressed, such as radio advertisements and on-line video advertisements.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A non-transitory computer-readable storage medium having encoded thereon data representing a model of a document, the document model comprising:
    a document object model (DOM);
    a one-dimensional character string portion that includes characters of the document in an order in which they appear in the document;
    a map of styles portion that includes markers that correspond to changes in styles in the document, and pointers to the character string, wherein the pointers define locations along the character string at which the changes in styles are to occur and define style runs between matched markers;
    one or more external references to objects outside the document model, the external references including identifiers for the objects and pointers to the character string indicating where in the character string the object will appear;
    wherein the objects are images, lists or tables that are outside the document mode;
    wherein reversing style changes are represented in the map of styles by a paired set of markers that are correlated with each other in the map of styles; and
    wherein the markers in the paired set are arranged so that, if text is added in the document between the markers, the pointer for one of the markers shifts by an integer equal to a number of characters in the added text.

2. The non-transitory computer-readable storage medium of claim 1, wherein the one-dimensional character string further includes reserved control characters that identify breaks in the document that are made visible when the document is rendered on a computing device.

3. The non-transitory computer-readable storage medium of claim 1, wherein the one-dimensional character string defines indexed positions along the string that are referenced by markers in the map of styles.

4. The non-transitory computer-readable storage medium of claim 1, wherein the map of styles defines one or more tethered styles that are correlated to a particular character in the one-dimensional character string rather than to a position in the string.

5. The non-transitory computer-readable storage medium of claim 1, wherein the tethered styles are implemented by markers in the one-dimensional character string.

6. The non-transitory computer-readable storage medium of claim 1, wherein the model further comprises one or more entity identifiers in the one-dimensional character string, the entity identifiers pointing to objects external to the document model whose content is integrated into the document when the document is rendered from the model.

7. The non-transitory computer-readable storage medium of claim 6, wherein the one-dimensional character string includes multiple instances of an identifier for a single entity.

8. A computer-implemented method of generating a document from a document model, comprising:
   a document object model (DOM);
   identifying, with a computing device, one or more characters in a one-dimensional character string portion of the document model that includes the characters of the document;
   searching an electronic sparse map of styles portion of the document model that is separate from, but correlates to, the one-dimensional character string, for style markers that apply to a span of characters that covers the identified one or more characters;
   generating the document using the computing device by applying, to the one or more characters, formatting that corresponds to style markers found to apply to the span of characters;
   further comprising locating in the one-dimensional character string one or more identifiers for objects outside the document model, accessing the objects, and rendering the objects into the document;
   wherein the objects are images, lists or tables that are outside the document mode;
   wherein generating the document comprises traversing the one-dimensional character string using pointers in the sparse character map that are mapped to the character string, and applying a particular formatting between a first pointer that activates the formatting, and a second pointer that deactivates the formatting; and
   further comprising receiving user input in the document at a location between the first pointer and the second pointer, and adjusting a location in the character string to which the second pointer points by an integer number that is equal to a number of characters in the user input.

9. The computer-implemented method of claim 8, wherein generating the document comprises rendering the document model into a document object model (DOM) of a web browser on the computing device.

10. The computer-implemented method of claim 8, further comprising receiving a user input in the document, correlating a location of the user input in a displayed view of the document to a position in the one-dimensional character string, and copying the user input to the one-dimensional character string.

11. The computer-implemented method of claim 10, wherein the user input comprises a paragraph break, and wherein copying the user input to the one-dimensional character string comprises inserting into the character string a reserved character combination that triggers the creation of a paragraph break when the document is generated from the model.

12. The computer-implemented method of claim 8, wherein the sparse map of styles defines one or more tethered styles that are correlated to a particular character in the one-dimensional character string rather than to a position in the string.

13. The computer-implemented method of claim 12, wherein the tethered styles are implemented by markers in the one-dimensional character string.

14. A model for an electronic document stored on a non-transitory computer-readable storage medium, the model comprising:
   a document object model (DOM);
   a one-dimensional character string portion of the model that includes a plurality of plaintext characters to be represented literally in the electronic document and one or more control codes for defining paragraph breaks in the electronic document;
   a map of styles portion of the model that is separate from, but correlated to, the one-dimensional character string, and that defines style markers that apply to a span of characters that covers the identified one or more characters; and
   one or more pointers in the model directed toward items external of the model to cause the external items to be incorporated into the electronic documents;
   wherein the items are images, lists or tables that are outside the document model;
   wherein reversing style changes are represented in the map of styles by a paired set of markers that are correlated with each other in the map of styles;
   wherein the markers in the paired set are arranged so that, if text is added in the document between the markers, the pointer for one of the markers shifts by an integer equal to a number of characters in the added text.

\* \* \* \* \*